United States Patent
Ikezawa

(10) Patent No.: US 7,348,812 B2
(45) Date of Patent: Mar. 25, 2008

(54) MULTIPHASED TRIANGULAR WAVE OSCILLATING CIRCUIT AND SWITCHING REGULATOR USING IT

(75) Inventor: Katsuya Ikezawa, Kanagawa (JP)

(73) Assignee: Texas Instruments Incorporated, Dallas, TX (US)

( * ) Notice: Subject to any disclaimer, the term of this patent is extended or adjusted under 35 U.S.C. 154(b) by 156 days.

(21) Appl. No.: 11/198,120

(22) Filed: Aug. 5, 2005

(65) Prior Publication Data
US 2007/0052459 A1    Mar. 8, 2007

(30) Foreign Application Priority Data
Aug. 5, 2004    (JP)    ............... 2004-229340

(51) Int. Cl.
*H03K 4/06*    (2006.01)
*G05F 1/00*    (2006.01)
(52) U.S. Cl. ............... 327/131; 327/132; 327/170; 323/284; 331/45
(58) Field of Classification Search ............... 327/131, 327/132, 134, 170, 247; 323/242, 282, 284; 331/45, 111, 143
See application file for complete search history.

(56) References Cited

U.S. PATENT DOCUMENTS

| 6,121,802 A | * | 9/2000 | Luciano et al. | ............. 327/131 |
| 6,587,006 B2 | * | 7/2003 | Kawajiri et al. | ............. 331/45 |
| 2005/0007167 A1 | * | 1/2005 | Tange | ............. 327/172 |

* cited by examiner

*Primary Examiner*—Quan Tra
*Assistant Examiner*—Colleen O'Toole
(74) *Attorney, Agent, or Firm*—William B Kempler; W. James Brady, III; Frederick J. Telecky, Jr.

(57) ABSTRACT

To oscillate and output multiphased triangular waves with a designed waveform shape, wave crest value, and phase relationship. This multiphased triangular wave oscillating circuit has two triangular wave generating circuits 10A and 10B for generating two phased triangular waves A and B with phases opposite each other, a middle point potential fixing element 20 that always fixes the middle point potential of the output voltage A and B of the two triangular wave generating circuits 10A and 10B at a fixed value, and a mode switching element 30 that instantly switches the output voltage generation mode (up-slope waveform mode/down-slope waveform mode) in the two triangular wave generating circuits 10A and 10B at a preset reference wave crest value level.

16 Claims, 5 Drawing Sheets

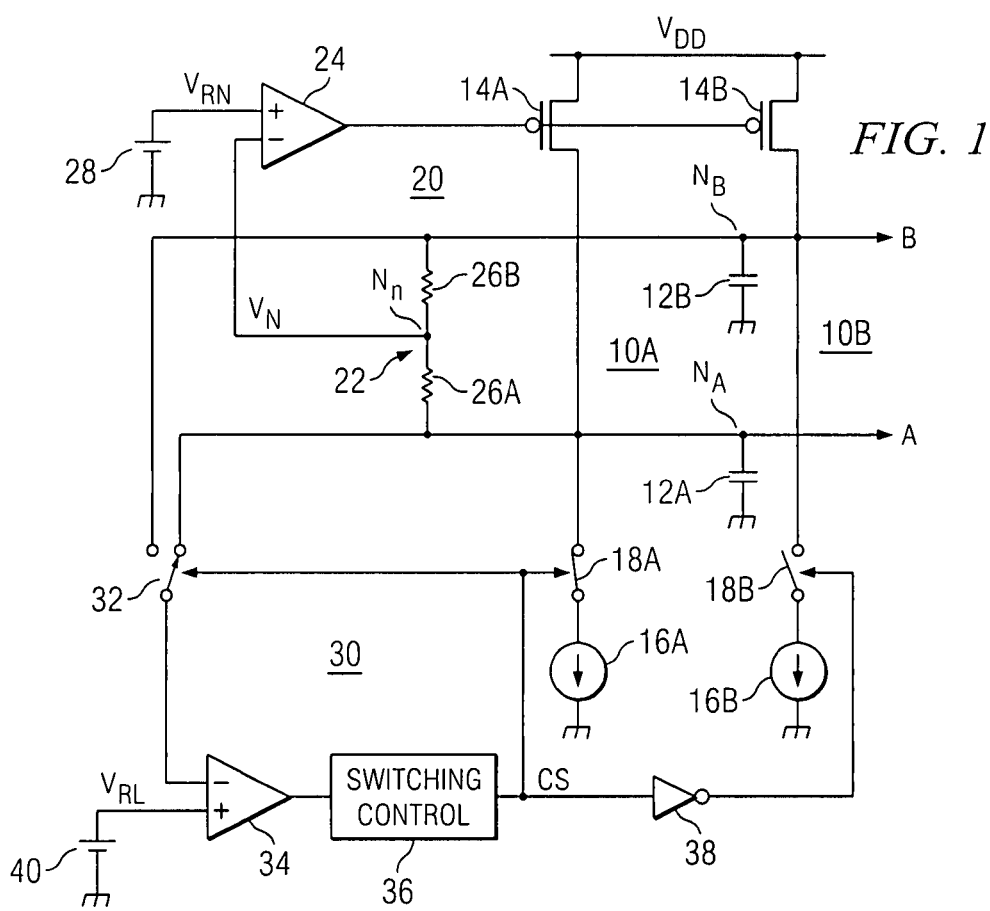
FIG. 1
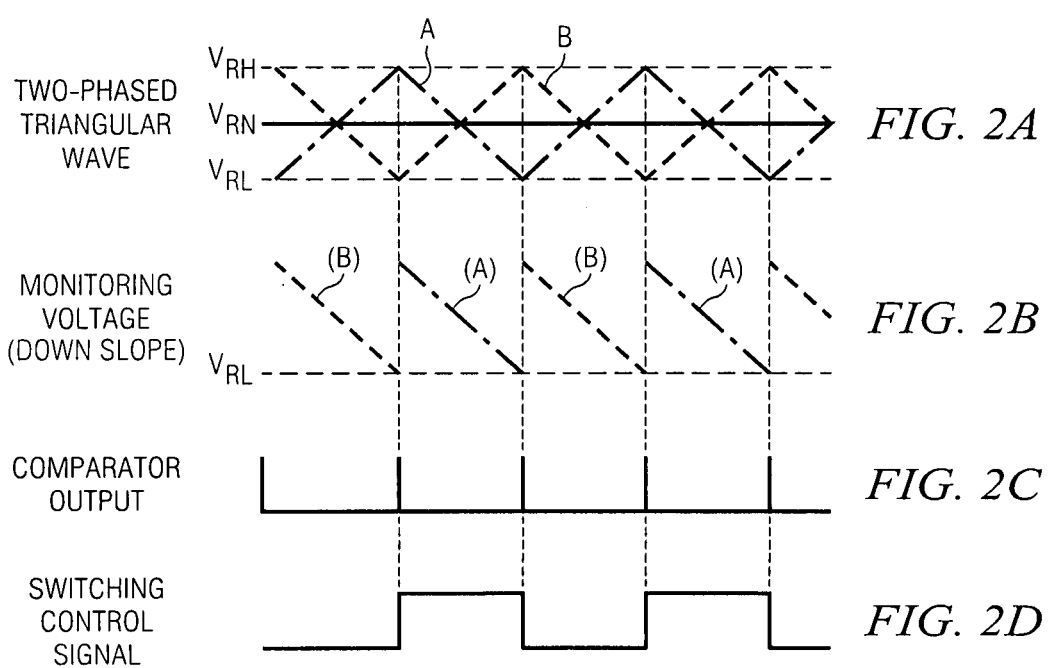
FIG. 2A
FIG. 2B
FIG. 2C
FIG. 2D

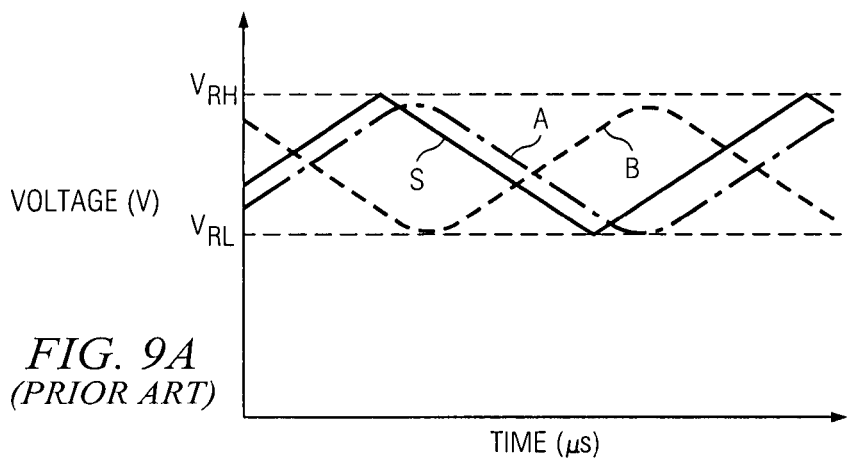
FIG. 9A
*(PRIOR ART)*
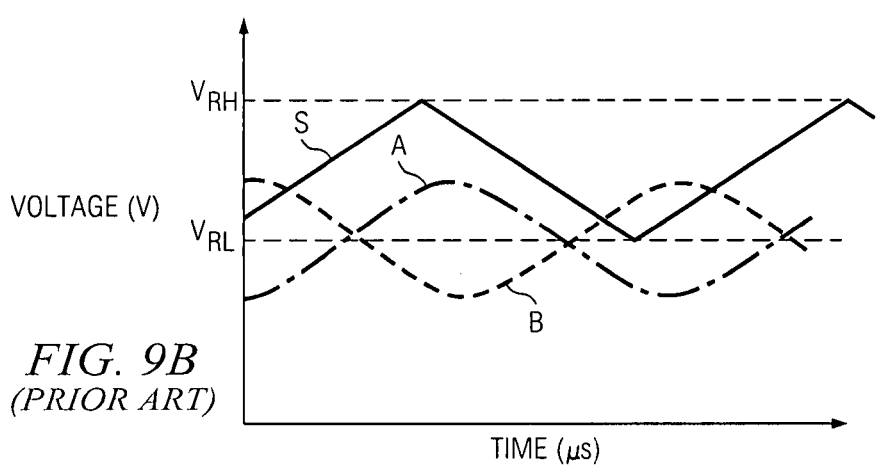
FIG. 9B
*(PRIOR ART)*
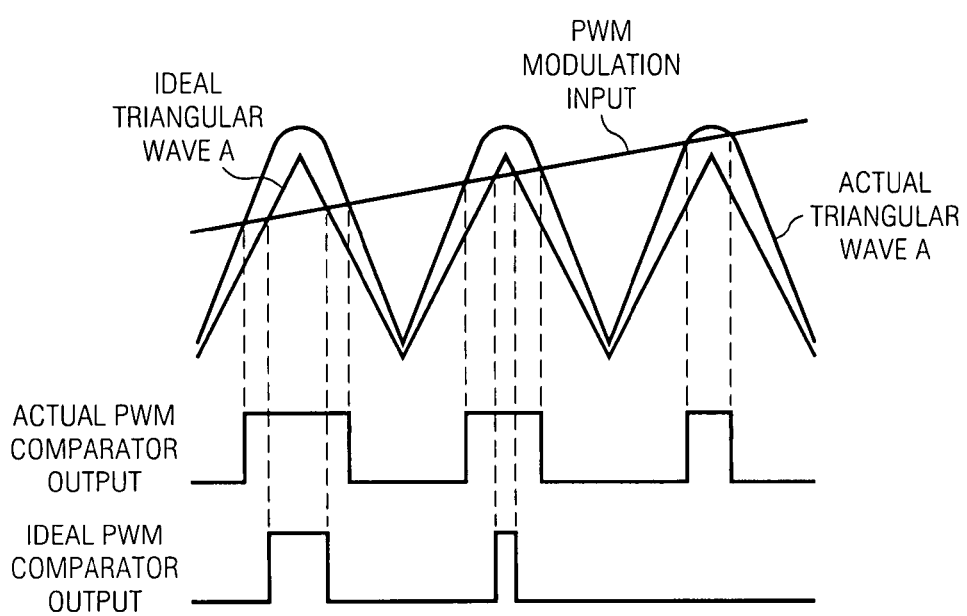
FIG. 10 *(PRIOR ART)*

MULTIPHASED TRIANGULAR WAVE OSCILLATING CIRCUIT AND SWITCHING REGULATOR USING IT

The present invention pertains to a triangular wave oscillating circuit that oscillates and outputs triangular waves. In particular, the present invention pertains to a multiphased triangular wave oscillating circuit, which simultaneously generates several triangular waves with different phases, and a switching regulator using it.

BACKGROUND OF THE INVENTION

Triangular waves are frequency signals that repetitively repeat the voltage change of a linear rise and fall and are typically used in pulse width modulation (PWM). For example, in PWM type feedback control, triangular waves and a feedback signal (PWM modulation input) are respectively input into a pair of input terminals of a comparator comprising an operational amplifier, and the voltage levels of two input signals are compared. In a section where the level of the triangular waves is higher than the feedback signal, a pulse string signal with a modulation pulse width as a first logic level (for example, H level) is generated, and in a section where the level of the triangular waves is lower than the level of the feedback signal, a pulse string signal with a modulation pulse width as a second logic level (for example, L level). Based on the pulse string signal, a switching element is switching-controlled.

When PWM control is simultaneously carried out by several subsystems in one system, several triangular waves are used. In this case, the application can be functional if the phases of these several triangular waves are appropriately shifted instead of being the same. For example, in an integrated circuit (IC) on which a multichannel switching regulator is mounted, a multiphase system that carries out a switching operation for several switching regulators on the same chip by shifting the phases is adopted to disperse the power consumption and to reduce the noise of an input line, and multiphased triangular waves are required.

FIG. 7 shows the configuration of a conventional multiphased triangular wave oscillating circuit used in PWM control. The multiphased triangular wave oscillating circuit is a two-phase type and has reference triangular wave oscillating circuit 100, differential amplifier 102, and output stage circuits 104 and 106.

The reference triangular wave oscillating circuit 100 comprises a radial wave oscillating circuit and an integrated circuit, for instance, and oscillates and outputs a reference triangular wave S with a fixed frequency close to nearly ideal waves. Reference voltages $V_{RH}$ and $V_{RL}$ corresponding to an upper limit wave crest value and a lower limit wave crest value of the reference triangular wave S are supplied to the reference triangular wave oscillating circuit 100 from a power supply circuit.

The differential amplifier 102 comprises a pair of differentially connected NMOS transistors 108 and 110, a constant current source 112 commonly connected to the sources of the two transistors, load resistors 114 and 116 respectively connected in parallel between the drains of the two transistors and a power supply voltage terminal $V_{DD}$, and time constant capacitors 118 and 120, and is constituted as a voltage follower at a low slew rate. The reference triangular wave S from the reference triangular wave oscillating circuit 100 is input into the gate terminal of one NMOS transistor 108, and a reference voltage $V_{RN}$ equal to the central level of the reference triangular wave S is input into the gate of the other NMOS transistor 110. In the drain of the NMOS transistor 108, a triangular wave A with almost the same phase or a regular phase slightly delayed from the phase of the reference triangular wave S is obtained, and in the drain of the NMOS transistor 110, a triangular wave B with a phase opposite the phase of the regular-phase triangular wave A is obtained. The output stage circuits 104 and 106 comprise buffer circuits or driving circuits that drive and output two phased triangular waves A and B from the differential amplifier 102 toward each corresponding PWM comparator (not shown in the figure).

FIG. 8 shows an ideal relationship between the reference triangular wave S and the two phased triangular waves A and B, and an ideal relationship between the two phased triangular waves A and B. In the figure, there are several offsets $\delta V$ between the upper limit wave crest value $V_{RH}$ and the lower limit wave crest value $V_{RL}$ of the reference triangular wave S, and the upper limit wave crest value $V_{GH}$ and the lower limit wave crest value $V_{GL}$ of the multiphased triangular waves A and B. The offset $\delta V$ is due to the threshold voltage of the NMOS transistors 108 and 110.

As mentioned above, in the conventional multiphased triangular wave oscillating circuit, the reference triangular wave S is generated by the reference triangular wave oscillating circuit 100, the triangular wave A with a regular phase and the triangular wave B with an opposite phase are simultaneously generated from the reference triangular wave S by the differential amplifier 102, and the two triangular waves A and B are driven and output by the output stage circuits 104 and 106. The two phased triangular waves A and B are oscillated and output by a so-called open loop type. In this open loop type, the precision of the multiphased triangular wave depends largely on scattering in the characteristics of the circuit elements.

In particular, in the two-phase triangular wave oscillating circuit of FIG. 7, the element characteristics are set identically between identical left and right functional elements in the differential amplifier 102, that is, between the two NMOS transistors 108 and 110, the two resistors 114 and 116, and the two capacitors 118 and 120. However, if scattering exists in the element characteristics between identical functional elements, the balance of the waveform and the phase of the two phased triangular waves A and B collapses. Also, even if the characteristics are the same for the same functional elements, if they deviate from the original specified characteristics or if there is an error in the electric characteristics due to a relationship with respect to other functional elements, the precision of the triangular waveform is lowered.

Actually, in the two-phase triangular wave oscillating circuit of FIG. 7, for example, as shown in FIGS. 9A and 9B, a large scattering is seen in the waveform precision, phase relationship, waveform level, etc., of multiphased triangular waves A and B among mass-produced products. The case of FIG. 9A is entirely close to an ideal value (FIG. 8), however the peaks of two triangular waves A and B are blunted. In the case of FIG. 9B, the peaks of the two triangular waves A and B are not only further blunted, but the wave crest value deviates considerably from the ideal value (FIG. 8).

Thus, if the precision of the triangular wave supplied to each PWM comparator from the multiphased triangular wave oscillating circuit is not good, clearly, the PWM modulation effect is affected. For example, as mentioned above, if the peaks of an actual triangular wave A (similarly, triangular wave B) are blunted, as shown in FIG. 10, the actual PWM modulation effect (PWM comparator output)

also deviates from an ideal value, resulting in a decrease in the precision of PWM control.

Also, in a PWM comparator, a voltage clamp (or limiter) function is installed so that the voltage level of the PWM modulation input cannot deviate by too large a level after shaking off (exceeding) the wave crest value of the triangular wave. In this case, the clamp level is set based on the ideal wave crest value; however if there is an error in the wave crest value of the actual triangular wave, the clamp function is also disturbed. For example, if the actual wave crest value deviates by a small absolute value when it separates from the clamp level, the clamp timing is delayed, so that a problem results in PWM control. For example, ripples are generated in the output of the switching regulator. Also, if the actual wave crest value deviates by a large absolute value when it exceeds the clamp level, the PWM modulation input is clamped in the wave crest value, so that a desired PWM modulation result cannot be obtained in the vicinity of the wave crest value (the vicinity of 0% duty or the vicinity of 100% duty).

In a general system for the PWM control, if a fine change of the PWM modulation input is $\Delta e$ and a fine change of the PWM modulation result is $\Delta m$, the signal processing of the PWM modulation is regarded as having an amplification stage of $\Delta m/\Delta e$. Therefore, if the wave crest value of the triangular wave or the peak to peak value deviates from an ideal value or set value or the waveform (especially, the peak) is blunted, the small signal characteristic of the PWM modulation is not exerted as desired. As a result, the gain is too high, so that abnormal oscillation is likely, or the gain is too low, so that insufficient precision is likely.

BRIEF SUMMARY OF THE INVENTION

The present invention considers the problems of the above-mentioned prior art, and provides a multiphased triangular wave oscillating circuit that can oscillate and output multiphased triangular waves of a designed waveform, wave crest value, and phase relationship.

The present invention also provides a multiphase oscillating circuit that can stably, reliably oscillate and output a desired multiphased triangular wave, even if scattering exists in the characteristics of the circuit elements.

A first example of a multiphased triangular wave oscillating circuit of the present invention includes N pieces (N is an integer of 2 or more) of triangular wave generating circuits that respectively, selectively generate the output voltage of an up-slope waveform and the output voltage of a down-slope waveform, a middle point potential detecting circuit that detects a middle point potential showing an additive average value of each output voltage of the above-mentioned N pieces of triangular wave generating circuits, a first control circuit that controls at least one of the output voltages of the above-mentioned N pieces of triangular wave generating circuits so that the above-mentioned middle point potential detected by the above-mentioned middle point potential detecting circuit can be matched with a first reference voltage at a fixed level, and a second control circuit that monitors each output voltage of the above-mentioned N pieces of triangular wave generating circuits and switches the output voltage generation mode of said triangular wave generating circuit from an up-slope waveform mode to a down-slope waveform mode or from a down-slope waveform mode to an up-slope waveform mode when each output voltage reaches a reference wave crest value.

In the first example multiphased triangular wave oscillating circuit, while N pieces of triangular wave generating circuits match the middle point potential with the reference value in a mutual balance relationship of each output voltage by the feedback function of the first control circuit and the mode switching function of the second control circuit, the up-slope waveform mode and the down-slope waveform mode are repeated at a fixed wave crest value and at a prescribed phase difference in an alternate fashion, so that a triangular wave with N phases is oscillated and output.

According to a preferred embodiment of the present invention, the middle point detecting circuit has a resistance circuit that has N pieces of resistance elements having the same resistance value, commonly connects one terminal of these N pieces of resistance elements, respectively connects the other terminal to the output terminals of N pieces of triangular wave generating circuits, and can obtain the above-mentioned middle point potential at the node of the common connection.

Also, according to a preferred embodiment, the first control circuit has a slope control circuit that compares the middle point potential detected by the middle point detecting circuit with the first reference potential and variably controls the slope characteristic of at least one output voltage of the above-mentioned N pieces of triangular wave generating circuits so that the comparison error may be zero.

Also, according to a preferred embodiment, each of the triangular wave generating circuits has a capacitor connected between the output terminal of said triangular wave generating circuit and the second reference potential, a charge circuit that charges the capacitor to generate the output voltage of the up-slope waveform, and a discharge circuit that discharges the capacitor to generate the output voltage of the down-slope waveform.

Also, according to a preferred embodiment, the second control circuit switches the operating mode of the capacitor from a charge mode to a discharge mode when the output voltage of the up-slope waveform reaches the upper limit reference wave crest value in each of the triangular wave generating circuits, and switches the operating mode of the capacitor from the discharge mode to the charge mode when the output voltage of the down-slope waveform reaches the lower limit reference waveform value.

A second example of a multiphased triangular wave oscillating circuit of the invention includes first and second triangular wave generating circuits that respectively, selectively generate the output voltage of an up-slope waveform and the output voltage of a down-slope waveform, a middle point potential detecting circuit that detects a middle point potential showing an additive average value of each output voltage of the above-mentioned first and second triangular wave generating circuits, a first control circuit that controls at least one of the output voltages of the above-mentioned first and second triangular wave generating circuits so that the above-mentioned middle point potential detected by the above-mentioned middle point potential detecting circuit can be matched with a first reference voltage at a fixed level, and a second control circuit that monitors the output voltages of the above-mentioned first and second triangular wave generating circuits and switches the output voltage generation mode of one of the above-mentioned first and second triangular wave generating circuits from an up-slope waveform mode to a down-slope waveform mode and switches the output voltage generation mode of the other from the down-slope waveform mode to the up-slope waveform mode when one of the output voltages reaches a reference wave crest value.

In the second example multiphased triangular wave oscillating circuit, while the first and second triangular wave generating circuits match the middle point potential with the reference value in a mutual balance relationship of each output voltage by the feedback function of the first control circuit and the mode switching function of the second control circuit, the up-slope waveform mode and the down-slope waveform mode are repeated at a fixed wave crest value and at an opposite phase in an alternate fashion, so that a triangular wave with two phases is oscillated and output.

According to a preferred embodiment of the present invention, the middle point detecting circuit has a resistance voltage dividing circuit that has two resistance elements having the same resistance value, commonly connects one terminal of each of these two resistance elements, connects the other terminal of each of them to the output terminals of the first and second triangular wave generating circuits, and can obtain the middle point potential at the node of the common connection.

Also, according to a preferred embodiment, the first triangular wave generating circuit has a first capacitor that is connected between the output terminal of the first triangular wave generating circuit and the second reference potential, a first charge circuit that charges the first capacitor to generate the output voltage of the up-slope waveform, and a first charge circuit that charges the first capacitor to generate the output voltage of the down-slope waveform; and the second triangular wave generating circuit has a second capacitor that is connected between the output terminal of the second triangular wave generating circuit and the second reference potential, a second charge circuit that charges the second capacitor to generate the output voltage of the up-slope waveform, and a second charge circuit that charges the second capacitor to generate the output voltage of the down-slope waveform.

Also, according to a preferred embodiment, at least one of the above-mentioned first and second charge circuits has a constant current circuit. Also, the first charge circuit and the second charge circuit can share one constant current circuit. In this case, the first control circuit compares the middle point detected by the middle point detecting circuit with the first reference potential and controls the bias with respect to the constant current circuit in a variable manner so that the comparison error is zero.

Also, according to a preferred embodiment, at least one of the first and second discharge circuits has a constant current circuit. The first discharge circuit and the second discharge circuit can also share one constant current circuit. Also, the constant current circuit may also be operated in accordance with a variable bias. In this case, the first control circuit can compare the middle point potential detected by the middle point potential detecting circuit with the first reference voltage and variably control the bias for the constant current circuit so that the comparison error may be zero.

Also, according to a preferred embodiment, the second control circuit switches the operating mode of the first capacitor in the first triangular wave generating circuit from a discharge mode to a charge mode and switches the operating mode of the second capacitor in the second triangular wave generating circuit from the charge mode to the discharge mode when the output voltage of the first triangular wave generating circuit reaches the lower limit reference wave crest value, and switches the operating mode of the second capacitor in the second triangular wave generating circuit from the discharge mode to the charge mode and switches the operation mode of the first capacitor in the first triangular wave generating circuit from the charge mode to the discharge mode when the output voltage of the second triangular wave generating circuit reaches the lower limit reference wave crest value.

Also, according to another preferred embodiment, the second control circuit switches the operating mode of the first capacitor in the first triangular wave generating circuit from the charge mode to the discharge mode and switches the operating mode of the second capacitor in the second triangular wave generating circuit from the discharge mode to the charge mode when the output voltage of the first triangular wave generating circuit reaches the upper limit reference wave crest value, and switches the operating mode of the second capacitor in the second triangular wave generating circuit from the charge mode to the discharge mode and switches the operation mode of the first capacitor in the first triangular wave generating circuit from the discharge mode to the charge mode when the output voltage of the second triangular wave generating circuit reaches the upper limit reference wave crest value.

The switching regulator of the present invention is characterized by the fact that in a switching regulator having a voltage input terminal, a voltage output terminal, a feedback signal generating circuit for generating a feedback signal corresponding to the output voltage appearing at the above-mentioned voltage output terminal, a triangular wave signal generating circuit for generating a triangular wave signal, a control signal generating circuit that inputs the above-mentioned feedback signal and the above-mentioned triangular wave signal and generates a PWM control signal, and a switching circuit PWM-controlled by the above-mentioned control signal, the above-mentioned triangular wave signal generating circuit is the multiphased triangular wave oscillating circuit of the present invention.

BRIEF DESCRIPTION OF THE DRAWINGS

Embodiments of the invention are described with reference to the accompanying drawings, wherein:

FIG. 1 is a circuit diagram showing the configuration of the multiphased triangular wave oscillating circuit of an embodiment of the present invention.

FIG. 2 is a signal waveform diagram showing a signal waveform of each part in the multiphased triangular wave oscillating circuit of the embodiment.

FIG. 9A is a waveform diagram of a two-phase triangular wave (an example) actually obtained in a conventional multiphased triangular wave oscillating circuit.

FIG. 9B is a waveform diagram of a two-phase triangular wave (another example) actually obtained in a conventional multiphased triangular wave oscillating circuit.

FIG. 10 is a waveform diagram showing PWM signal processing when a conventional multiphased triangular wave oscillating circuit is used.

Figure 3A:
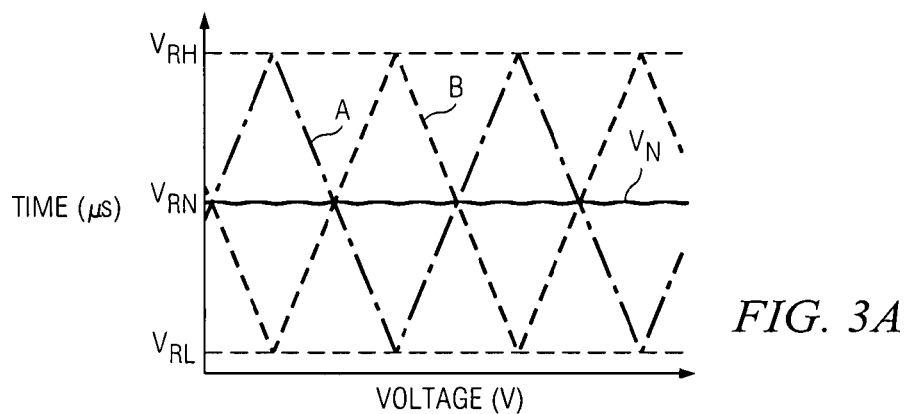
FIG. 3A is a waveform diagram showing the waveform of a two-phase triangular wave (an example) obtained by simulation in the multiphased triangular wave oscillating circuit of the embodiment.

DETAILED DESCRIPTION OF EMBODIMENTS
OF THE INVENTION

In the figures, 10A, 10B, 10C, represent triangular wave generating circuits; 12A, 12B, 12C represent capacitors; 14A, 14B, 14C, 14M represent source constant-current circuits; 16A, 16B, 16C, 16M represent sink constant-current circuits; 18A, 18B, 18C represent ON/OF switches; 18P, 18Q represent changeover switches; 20 represents a middle point potential fixing element; 22 represents a middle point potential detecting circuit; 24 represents a middle point potential control circuit; 26A, 26B, 26C represent resistors; 28 represents a reference voltage generating circuit; 30 represents a mode switching element; 32 represents a changeover switch; 34, 34A, 34B represent comparators; 36 represents a switching control circuit; 40, 42 represent reference voltage generating circuits; and 44 represents a voltage level monitoring circuit.

In embodiments of the multiphased triangular wave oscillating circuit of the present invention, the multiphased triangular wave can be oscillated and output with a designed waveform, wave crest value, and phase relationship. Also, even if scattering exists in the characteristics of the circuit elements, a desired multiphased triangular wave can be stably, reliably oscillated and output.

In embodiments of the switching regulator of the invention, with the adoption of the multiphased triangular wave oscillating circuit of the present invention, a high-performance and high-reliability switching operation can be realized using a high-precision PWM control.

FIGS. 1-6 illustrate preferred embodiments of the invention.

FIG. 1 shows the configuration of the multiphased triangular wave oscillating circuit of an embodiment of the present invention. The illustrated multiphased triangular wave oscillating circuit is a two-phase type and has two triangular wave generating circuits 10A and 10B for generating two phased triangular waves A and B with an opposite phase.

The first triangular wave generating circuit 10A has a first capacitor 12A connected between a first node $N_A$ for outputting a triangular wave A with a regular phase and ground potential, a constant current circuit 14A for source or charge connected between a power supply voltage terminal $V_{DD}$ and the node $N_A$, and a constant current circuit 16A for sink or discharge connected between the node $N_A$ and the ground potential. The source constant-current circuit 14A comprises a PMOS transistor in which the gate terminal is connected to the output terminal of a control circuit 24 of a middle point potential fixing element 20, which will be mentioned later, and can vary the source (charge) current by a variable bias. The sink constant-current circuit 16A sends a sink (discharge) current of a fixed value at a constant bias. The current sink capacity of the sink constant-current circuit 16A is larger than the current supply capacity of the source constant-current circuit 14A, and for example, about double is selected.

In the first triangular wave generating circuit 10A, an ON/OFF switch 18 is inserted between the node $N_A$ and the sink constant-current circuit 16A. If the switch 18 is switched from the ON state to the OFF state, all source current from the source constant-current circuit 14A is introduced into the capacitor 12A, and a constant current is charged in the capacitor 12A. During the charging operation, the potential of the node $N_A$ rises linearly at a nearly constant gradient, and the output voltage of an up-slope waveform is generated.

If the switch 18 is switched from the OFF state to the ON state, the sink constant-current circuit 16A is connected to the capacitor 12A, and a constant voltage is discharged in the capacitor 12A. Here, since the current sink performance of the sink constant-current circuit 16A is superior to the current supply performance of the source constant-current circuit 14A, the source current from the source constant-current circuit 14A along with the discharge current from the capacity 12A is sunk into the sink constant-current circuit 16A. During this discharge operation, the potential of the node $N_A$ is linearly lowered at a nearly constant gradient, and the output voltage of a down-slope waveform is generated.

The switch 18 is turned on and off in an alternate fashion at a fixed period, and the charge operation and the discharge operation of the capacitor 12A are alternately repeated by the switching, so that triangular wave A in which the up-slope waveform and the down-slope waveform are repeated in an alternate fashion is output from the node $N_A$.

The second triangular wave generating circuit 10B has a second capacitor 12B connected between a second node $N_B$ for outputting a triangular wave B with an opposite phase and the ground potential, a constant current circuit 14B for source or charge connected between the power supply voltage terminal $V_{DD}$ and the node $N_B$, and a constant current circuit 16B for sink or discharge connected between the node $N_B$ and the ground potential. The source constant-current circuit 14B may comprise a PMOS transistor in which the gate terminal is connected to the output terminal of the control circuit 24 of the middle point potential fixing element 20, which will be mentioned later, and can vary the source (charge) current by a variable bias. The sink constant-current circuit 16B sends a sink (discharge) current of a fixed value at a constant bias. The current sink capacity of the sink constant-current circuit 16B is larger than the current supply capacity of the source constant-current circuit 14B, and for example, about double is selected.

In the second triangular wave generating circuit 10B, an ON/OFF switch 18B is inserted between the node $N_B$ and the sink constant-current circuit 16B. If the switch 18B is switched from the ON state to the OFF state, all source current from the source constant-current circuit 14B is introduced into the capacitor 12B, and a constant current is charged in the capacitor 12B. During the charging operation, the potential of the node $N_B$ rises linearly at a nearly constant gradient, and the output voltage of an up-slope waveform is generated.

If the switch 18B is switched from the OFF state to the ON state, the sink constant-current circuit 16B is connected to the capacitor 12B, and a constant voltage is discharged in the capacitor 12B. Here, since the current sink capability of the sink constant-current circuit 16B is superior to the current supply capability of the source constant-current circuit 14B, the source current from the source constant-current circuit 14B along with the discharge current from the capacitor 12B is sunk into the sink constant-current circuit 16B. During this discharge operation, the potential of the node $N_B$ is linearly lowered at a nearly constant gradient, and the output voltage of a down-slope waveform is generated.

The switch 18B is turned on and off in an alternate fashion at a fixed period, and the charge operation and the discharge operation of the capacitor 12B are alternately repeated by the switching, so that the triangular wave B in which the up-slope waveform and the down-slope waveform are repeated in an alternate fashion is output from the node $N_B$.

Also, the switch 18A in the first triangular wave generating circuit 10A and the switch 18B in the second triangular wave generating circuit 10B have an ON/OFF relationship with phases opposite each other. In other words, for the period in which the switch 18A is in the ON state, the switch 18B is in the OFF state, and for the period in which the switch 18B is in the OFF state, the switch 18A is in the OFF state. Thus, the charge operation (up-slope waveform output) of the capacitor 12A in the first triangular wave generating circuit 10A and the discharge operation (down-slope waveform output) of the capacitor 12B in the second triangular wave generating circuit 10B are executed simultaneously or in parallel, and the discharge operation (down-slope waveform output) of the capacitor 12A in the first triangular wave generating circuit 10A and the charge operation (up-slope waveform output) of the capacitor 12B in the second triangular wave generating circuit 10B are executed simultaneously or in parallel. Thus, the triangular wave A with a regular phase is oscillated and output from the node $N_A$ of the first triangular wave generating circuit 10A, and the triangular wave B with an opposite phase is oscillated and output from the node $N_B$ of the second triangular wave generating circuit 10B.

In the two-phase triangular wave oscillating circuit, if the two phased triangular waves A and B are oscillated and output with a general isosceles triangle waveform, each capacitance of the capacitors 12A and 12B in the first and second triangular wave generating circuits 10A and 10B is set at the same value, and the current sink capacity of each sink constant-current circuit 16A and 16B can be set at the same value.

In addition to the above-mentioned one pair of triangular wave generating circuits 10A and 10B, the two-phase triangular wave oscillating circuit includes a middle point potential fixing element 20 that always fixes the middle point potential of the output voltages A and B of the two triangular wave generating circuits 10A and 10B at a fixed value and a mode switching element 30 that instantly switches the output voltage generation modes (up-slope waveform mode/down-slope waveform mode) in the two triangular wave generating circuits 10A and 10B by means of a preset reference wave crest value level.

The middle point fixing element 20 has a middle point potential detecting circuit 22 connected between the first node $N_A$ and the second node $N_B$ and a middle point potential control circuit 24 for controlling at least one of the output voltages A and B of the two triangular wave generating circuits 10A and 10B so that a middle point potential $V_N$ detected by the middle point potential detecting circuit 22 can be matched with a preset reference middle point potential $V_{RN}$.

The middle point potential detecting circuit 22 comprises a resistance voltage-dividing circuit constituted by connecting two resistors 26A and 26B of equal resistance value in series between the two nodes $N_A$ and $N_B$, and the node $N_n$ of the connecting point of the two resistors 26A and 26B is used as a middle point potential detecting terminal. In the middle point potential detecting circuit 22, the potential (voltage level of the triangular wave A) of the node $N_A$ and the potential (voltage level of the triangular wave B) of the node $N_B$ are divided by the two resistors 26A and 26B with an equal resistance value, so that the middle point potential $V_N$ showing an additive average value (A+B)/2 of the voltage level of the two triangular waves A and B can be obtained at node $N_n$.

The middle point potential control circuit 24 comprises an operational amplifier operated as an inverting amplifier, and the middle point potential $V_N$ from the middle point potential detecting circuit 22 is input into its inverting input terminal. The preset reference middle point potential $V_{RN}$ from the reference potential generating circuit 28 is input into the non-inverting input terminal of the middle point potential control circuit (operational amplifier) 24. As mentioned above, the output terminal of the middle potential control circuit (operational amplifier) 24 is connected to the control terminals of the source constant-current circuits (PMOS transistors) 14A and 14B in the first and second triangular wave generating circuits 10A and 10B. The middle point potential control circuit (operational amplifier) 24 executes an amplifying operation so that an imaginary short circuit may be formed at the input side. In other words, the output voltage of the middle point control circuit 24 acts as a bias voltage on the source constant-current circuits (PMOS transistors) 14A and 14B of the two triangular wave generating circuits 10A and 10B so that the actual middle point potential $V_N$ detected by middle point potential detecting circuit 22 is consistent with the reference middle point potential $V_{RN}$.

The two source constant-current circuits 14A and 14B function in accordance with the mode of each triangular wave generating circuit 10A and 10B as mentioned. In other words, when the first triangular wave generating circuit 10A is in the up-slope waveform mode, the source constant-current circuit 14A supplies a charging current to the capacitor 12A, and the charge voltage of the capacitor 12A is linearly raised at a constant gradient. Here, the charge characteristic (up-slope characteristic of the triangular wave A) in the capacitor 12A receives feedback control from the middle point potential control circuit 24 via the source constant-current circuit 14A. On the other hand, at that time, the second triangular wave generating circuit 10B is in the down-slope waveform mode, and the discharge characteristic (down-slope characteristic of the triangular wave B) of the capacitor 12B is constantly controlled by the sink constant-current circuit 16B that sends a constant sink current and discharge current.

When the first triangular wave generating circuit 10A is in the down-slope waveform mode and the second triangular wave generating circuit 10B is in the up-slope waveform mode, a similar operation is carried out by setting the states or relationship of both opposite the above-mentioned states or relationship. In other words, the discharge characteristic (down-slope characteristic of the triangular wave A) of the capacitor 12A in the first triangular wave generating circuit 10A is constantly controlled by the sink constant-current circuit 16A, and the charge characteristic (up-slope characteristic of the triangular wave B) of the capacitor 12B in the second triangular wave generating circuit 10B receives feedback control from the middle point potential control circuit 24 via the source constant-current circuit 14B.

Thus, in this embodiment, of the two phased triangular waves A and B generated by the first and second triangular wave generating circuits 10A and 10B, the down-slope characteristic of the triangular wave in the down-slope waveform mode is controlled to a constant gradient by the sink constant-current circuit 16A (16B) with a fixed bias.

Then, the up-slope characteristic of the triangular wave in the up-slope waveform mode is controlled via the source constant-current circuit 14A (14B) with a variable bias by feedback control so that the middle point potential fixing element 20 (middle point potential detecting circuit 22 and middle point potential control circuit 24) can match the actual middle point potential $V_N$ of two triangular waves A, B with the reference middle point potential $V_{RN}$. Thus, as shown in FIG. 2(a), the voltage level of the two phased triangular waves A and B is always changed around $V_{RN}$ by the up and down contrast slopes, so that both are maintained in an opposite phase relationship in which the up and down are inverted.

The mode switching element 30 has changeover switch 32, comparator 34, switching control circuit 36, and inverting circuit 38. In the changeover switch 32, one input terminal is connected to the first node $N_A$, and the other input terminal is connected to the second node $N_B$. The output terminal is connected to one input terminal of the comparator 34 and is switched in accordance with the output signal (switching control signal) CS of the switching control circuit 36. Here, the switching control signal CS output from the switching control circuit 36 is also given to the ON/OFF switch 18A of the first triangular wave generating circuit 10A and is also given to the ON/OFF switch 18B of the second triangular wave generating circuit 10B via the inverting circuit 38. In other words, when the switching control signal CS is at the H level, switch 18A is turned on, and switch 18B is turned off. When the switching control signal CS is at the L level, switch 18A is turned off, and switch 18B is turned on.

The changeover switch 32 is switched to the node $N_A$ while the ON/Off switch 18A is turned on (while the first triangular wave generating circuit 10A is in the down-slope waveform mode) and transfers the down-slope waveform of the triangular wave A to the comparator 34. Also, it is switched to the node $N_B$ while the ON/Off switch 18B is turned on (while the second triangular wave generating circuit 10B is in the down-slope waveform mode) and transfers the down-slope waveform of the triangular wave B to the comparator 34. FIG. 2(b) shows the monitoring voltage (down-slope waveform) obtained at the output terminal of the changeover switch 32.

The comparator 34 inputs the reference lower limit wave crest value potential $V_{RL}$ into the other input terminal from a reference voltage generating circuit 40, compares the size of the voltage levels of the two inputs A (or B) and $V_{RL}$, and outputs the comparison result of the two values. For example, when A (or B)>$V_{RL}$, the L level is output, and when A (or B)≦$V_{RL}$, the H level is output. Therefore, as shown in FIGS. 2(b) and (c), when the triangular wave A in the down-slope waveform mode in the first triangular wave generating circuit 10A descends to the reference lower limit wave crest value potential $V_{RL}$, the output of the comparator 34 is changed from the previous L level at that time to the H level. Also, when the triangular wave B at the down-slope waveform mode in the second triangular wave generating circuit 10B descends to the reference lower limit wave crest value potential $V_{RL}$, the output of the comparator 34 is changed from the previous L level out that time to the H level.

If the output of the comparator 34 is changed from the L level to the H level, as shown in FIGS. 2(c) and (d), the switching control circuit 36 inverts the logic level of switching control signal CS in response to it. If the switching control signal CS is inverted from the L level to the H level, the switch 18A is closed in the first triangular wave generating circuit 10A, and the up-slope waveform mode at that time is switched to the down-slope waveform mode. In the second triangular wave generating circuit 10B, the switch 18B is opened, and the down-slope waveform mode at that time is switched to the up-slope waveform mode. At that time, the changeover switch 32 has been switched to the second node $N_B$; however it is switched to the first node $N_A$, so that the output of the comparator 34 is returned from the H level to the L level.

Also, if the switching control signal CS is inverted from the H level to the L level, the switch 18A is closed in the first triangular wave generating circuit 10A, and the down-slope waveform mode by that time is switched to the up-slope waveform mode. In the second triangular wave generating circuit 10B, the switch 18B is opened, and the up-slope waveform mode at that time is switched to the down-slope waveform mode. At that time, the changeover switch 32 has been switched to the first node $N_A$; however it is switched to the second node $N_B$, so that the output of the comparator 34 is returned from the H level to the L level.

Thus, the mode switching element 30 uses switch 32 and comparator 34 to monitor the voltage level of the triangular wave in the down-slope mode of the two phased triangular waves A and B and detects the timing at which the voltage level arrives at the reference lower limit wave crest value $V_{RL}$. Here, it is important in this embodiment that the voltage level of the two phased triangular waves A and B always maintain an up and down contrast relationship around the reference middle potential $V_{RN}$ by the action of the middle point potential fixing element 20 as mentioned above and the timing at which one voltage level arrives at the reference lower limit wave crest value $V_{RL}$ and the timing at which the other voltage level arrives at the reference upper limit wave crest value $V_{RH}$ are always matched. Also, there is a relationship of $V_{RH}-V_{RN}=V_{RN}-V_{RL}$.

Therefore, the mode switching element 30 directly monitors the voltage level of the triangular wave in the down-slope mode of the two phased triangular waves A and B and indirectly monitors the voltage level of the triangular wave in the up-slope mode, so that the timing at which the voltage level of the triangular wave in the down-slope mode arrives at the lower limit wave crest value $V_{RL}$ is directly detected and the timing at which the voltage level of the triangular wave in the up-slope mode arrives at the reference upper limit wave crest value $V_{RH}$ is also indirectly detected.

As mentioned above, with the actions of the middle point potential fixing element 20 and the mode switching element 30, the high-precision two phased triangular waves A and B with a designed (ideal) waveform shape, wave crest value, phase relationship, and frequency can be stably oscillated and output by the two triangular wave oscillating circuits 10A and 10B. Therefore, with the use of the multiphased triangular wave oscillating circuit of the present invention in PWM control, the multiphase type PWM control with high reliability can be realized.

Figure 3B:
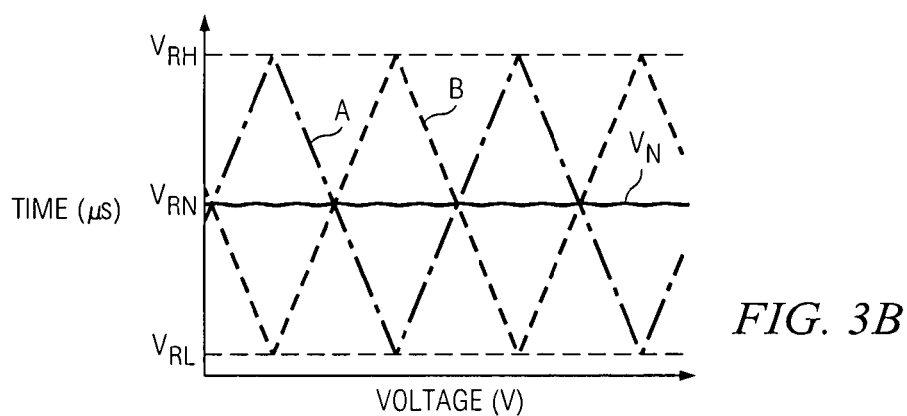
FIG. 3B is a waveform diagram showing the waveform of a two-phase triangular wave (another example) obtained by simulation in the multiphased triangular wave oscillating circuit of the embodiment.

Furthermore, in this embodiment, as mentioned above, since the slope characteristic of the two phased triangular waves A and B are dynamically matched with set values by the feedback loop, scattering of the circuit elements can be absorbed. FIGS. 3A and 3B show simulated two-phase triangular waveforms in which scattering of the element characteristics of the circuit elements is applied to the two-phase triangular wave oscillating circuit in this embodiment. FIG. 3A shows the case where the degree of scattering of the element characteristics is small, and FIG. 3B shows the case where the degree of scattering is large. As shown in the figures, there is little difference between them, and in any case, the two phased triangular waves A and B can be obtained as designed.

In this embodiment, the sink constant-current circuits 16A and 16B are respectively installed in the first and second triangular wave oscillating circuits 10A and 10B. As mentioned above, the sink constant-current circuit 16A of the first triangular wave oscillating circuit 10A directly prescribes the angle of inclination of the down slope of said triangular wave A and further prescribes the angle of inclination of the up slope of triangular wave B in the second triangular wave oscillating circuit 10B through the action of the middle point potential fixing element 20. On the other hand, the sink constant-current circuit 16B of the second triangular wave oscillating circuit 10B prescribes the angle of inclination of the down slope of said triangular wave B and further prescribes the angle of inclination of the up slope of triangular wave A in the first triangular wave oscillating circuit 10A through the action of the middle point potential fixing element 20. Therefore, the two phased triangular waves A and B can also be oscillated and output in a sawtooth or ramp waveform with a prescribed gradient by giving a prescribed amount of difference to the current sink capacity of the two sink constant-current circuits 16A and 16B.

Figure 4:
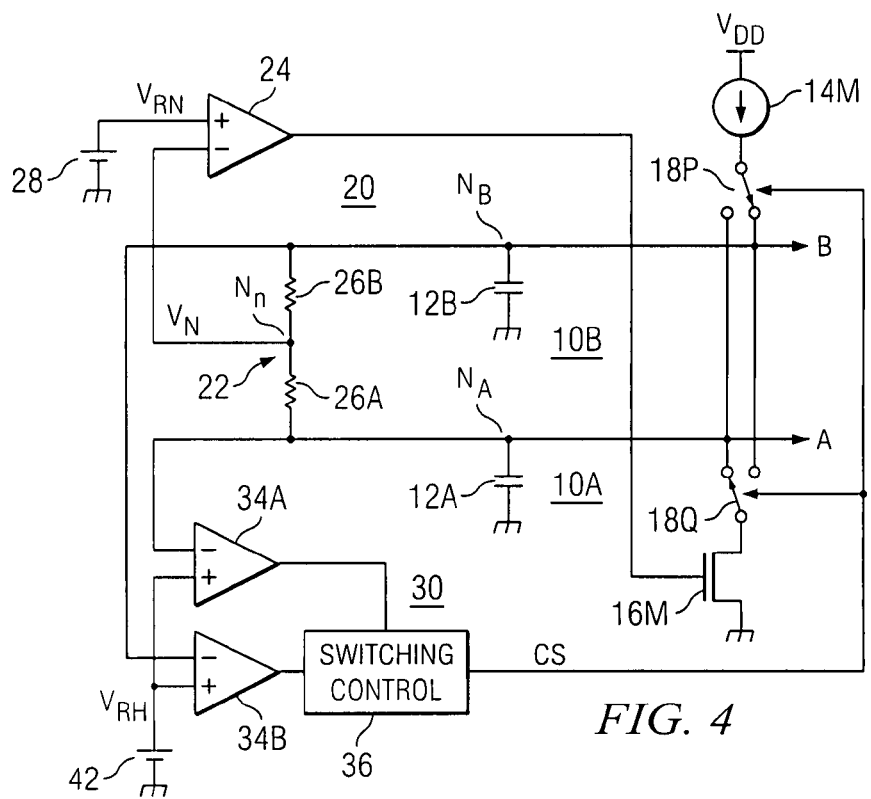
FIG. 4 is a circuit diagram showing the configuration of a modified example of the multiphased triangular wave oscillating circuit of the embodiment.

In addition, various modifications are possible in this embodiment, and the circuit configuration of a modified example in which some of them are applied is shown in FIG. 4.

In the circuit configuration of FIG. 4, one source constant-current circuit 14M and one sink constant-current circuit 16M are shared in the first and second triangular wave oscillating circuits 10A and 10B by switching. Specifically, the source constant-current circuit 14M is selectively connected to one of first node $N_A$ and second node $N_B$ via a changeover switch 18P. On the other hand, the sink constant-current circuit 16M is selectively connected to one of first node $N_A$ and second node $N_B$ via a changeover switch 18Q. The two changeover switches 18P and 18Q are operated in accordance with switching control signal CS from the switching control circuit 36.

For example, when the switching control signal is at the H level, the changeover switch 18P is switched to second node $N_B$, and the changeover switch 18Q is switched to first node $N_A$. At that time, the discharge operation (down-slope waveform output) of the capacitor 12A is carried out in the first triangular wave generating circuit 10A, and the charge operation (up-slope waveform output) of the capacitor 12B is carried out in the second triangular wave generating circuit 10B. Also, when the switching control signal CS is at the L level, the changeover switch 18P is switched to first node $N_A$, and the changeover switch 18Q is switched to second node $N_B$. At that time, the charge operation (up-slope waveform output) of the capacitor 12A is carried out in the first triangular wave generating circuit 10A, and the discharge operation (down-slope waveform output) of the capacitor 12B is carried out in the second triangular wave generating circuit 10B.

Also, in the circuit configuration of FIG. 4, the sink constant-current circuit 16M is constituted by a bias-variable NMOS transistor, and the output of the middle potential control circuit 24 is given as a bias to the control terminal of the sink constant-current circuit (NMOS transistor) 16M. On the other hand, the source constant-current circuit 14M is a constant current circuit with a fixed bias and sends a preset constant (fixed value) source current. In this case, the up-slope characteristic of the triangular wave at the up-slope waveform mode of the two phased triangular waves A and B generated by the first and second triangular wave generating circuits 10A and 10B is controlled to a constant gradient by the source constant-current circuit 14M with a fixed bias. Thus, the down-slope characteristic of the triangular wave at the down-slope waveform mode is controlled through feedback control by the middle point potential fixing element 20 (middle point potential detecting circuit 22 and middle point potential control circuit 24) so that the actual middle point potential $V_N$ of the two triangular waves A and B can be matched with the reference middle point potential $V_{RN}$.

Also, in the circuit configuration of FIG. 4, the changeover switch (32) is omitted in the mode switching element 30, and two comparators 34A and 34B are installed instead. A reference voltage corresponding to the reference upper limit wave crest value $V_{RH}$ is given from the reference voltage generating circuit 42 to comparators 34A and 34B. One comparator 34A monitors the voltage level of the triangular wave A output from the first triangular wave generating circuit 10A and detects the timing at which the voltage level arrives at the reference upper limit wave crest value $V_{RH}$. The other comparator 34B monitors the voltage level of the triangular wave B output from the second triangular wave generating circuit 10B and detects the timing at which the voltage level arrives at the reference upper limit wave crest value $V_{RH}$. The switching control circuit 36 inverts the logic level of the switching control signal CS in an alternating fashion in response to the output of the two comparators 34A and 35B.

Also, in the circuit configurations of FIGS. 1 and 4, the capacitors 12A and 12B are connected to the ground potential but they can be connected to an optional reference voltage. Also, the above-mentioned embodiments have circuit configurations in which two phased triangular waves are oscillated and output; however, the multiphased triangular wave oscillating circuit of the present invention can also oscillate and output multiphased triangular waves of three phases or more.

Figure 5:
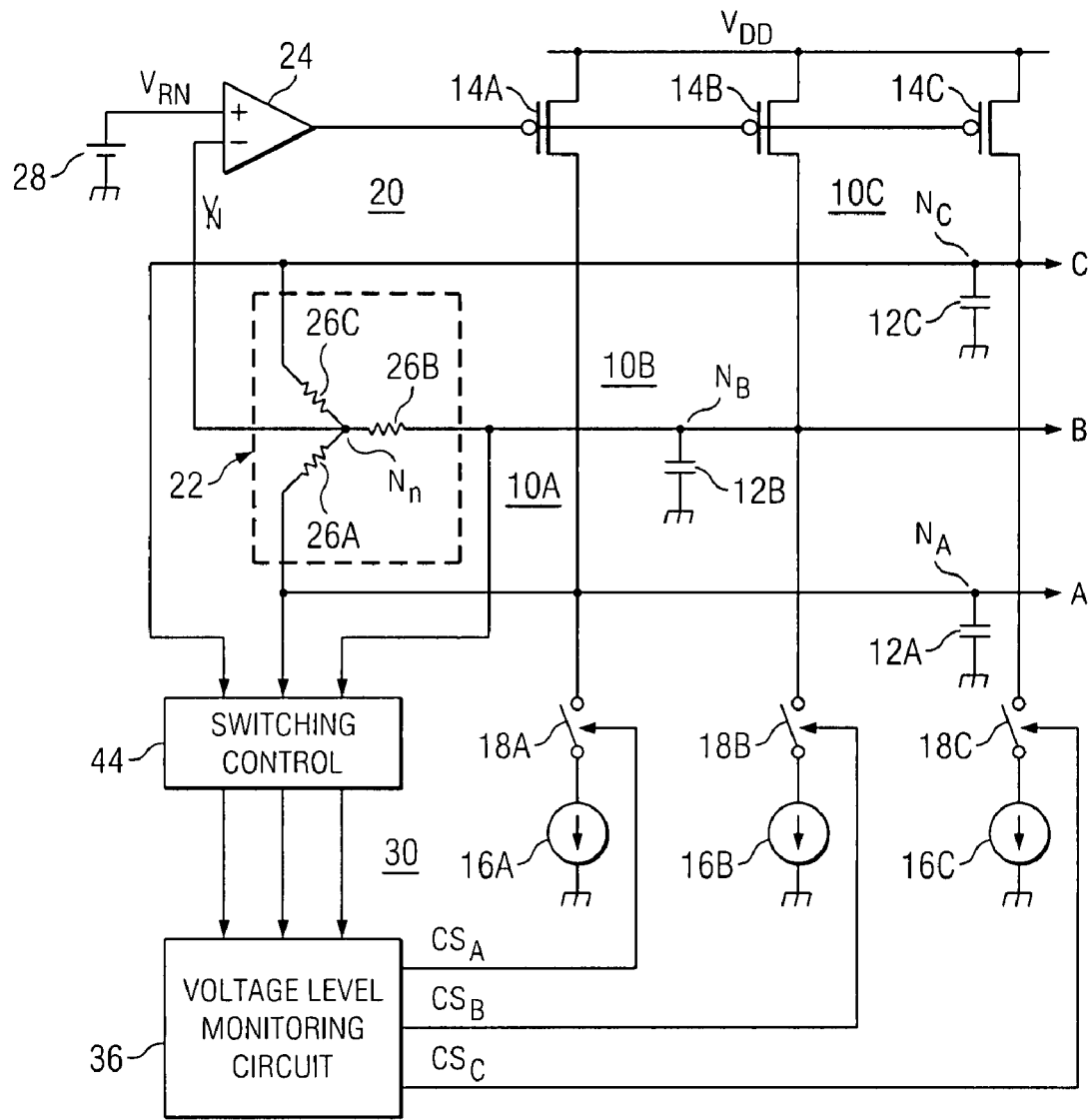
FIG. 5 is a circuit diagram showing the configuration of another modified example of the multiphased triangular wave oscillating circuit of the embodiment.

FIG. 5 shows the configuration of a three-phase triangular wave oscillating circuit of a modified example of the above-mentioned embodiments. In the figure, the same symbols are given to the elements having a configuration or function similar to that of the two-phase triangular wave oscillating circuit (FIG. 1) of the embodiment in the figure.

In this modified example, as shown in FIG. 5, a one-phase triangular wave generating circuit 10C for generating a third triangular wave C is installed in parallel in the circuit configuration of FIG. 1. Along with it, in the middle point potential detecting circuit 22 of the middle point potential fixing element 20, a third resistor 26C connected to a node (output terminal) $N_c$ of the third triangular wave generating circuit 10C is added, and along with the first and second resistors 26A and 26B, these three resistors constitute a resistance circuit with a star connection. Here, the resistance values of these three resistors 26A, 26B, and 26C are set at the same value. In this case, at the middle point node $N_n$ of the middle point potential detecting circuit 22, the middle point potential $V_N$ showing the additive average value (A+B+C)/3 of the voltage level of three triangular waves A, B, and C output from the first, second, and third triangular wave generating circuits 10A, 10B, and 10C can be obtained.

In the three-phase triangular wave oscillating circuit, three triangular waves A, B, and C repeat an up-slope waveform and a down-slope waveform with a phase difference of 120° C., and one or two of the three third triangular wave generating circuits 10A, 10B, and 10C are always operated at the up-slope waveform mode. The middle point potential control circuit 24 acts on the triangular wave generating circuits 10 at the up-slope waveform mode so that the actual middle point potential $V_N$ of the three triangular waves A, B, and C can be matched with the reference middle point potential $V_{RN}$, and the up-slope characteristic of said triangular wave is controlled via the source constant-current circuit 14 of said variable bias by feedback control.

The mode switching element 30 has a voltage level monitoring circuit 44 for monitoring the voltage level for each of the three triangular waves A, B, and C output from the first, second, and third triangular wave generating circuits 10A, 10B, and 10C. The voltage level monitoring circuit 44 sets the reference lower limit wave crest value $V_{RL}$ and the reference upper limit wave crest value $V_{RH}$ common to each triangular wave A, B, and C, and the timing at which each down slope arrives at the reference lower limit wave crest value $V_{RL}$ and the timing at which each up slope arrives at reference upper limit wave crest value $V_{RH}$ are detected for each triangular wave A, B, and C. The switching control circuit 36 is operated in accordance with the output (monitoring information) from the voltage level monitoring circuit 44, and individual switching control signals $CS_A$, $CS_B$, and $CS_C$ are given to the ON/OFF switches 16A, 16B, and 16C of the triangular wave generating circuits 10A, 10B, and 10C.

Figure 6:
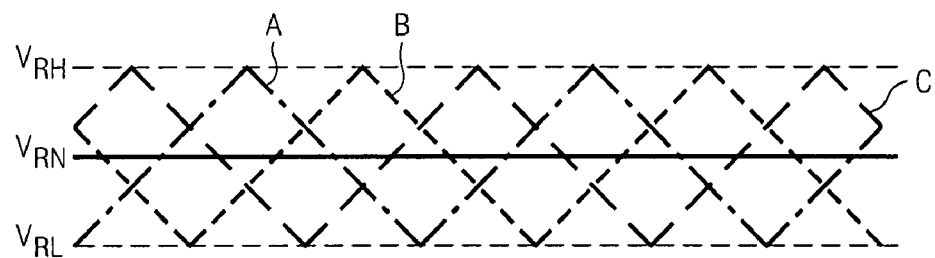
FIG. 6 is a signal waveform diagram showing the waveform of a three-phase triangular wave obtained by the multiphased triangular wave oscillating circuit of FIG. 5.
Figure 7:
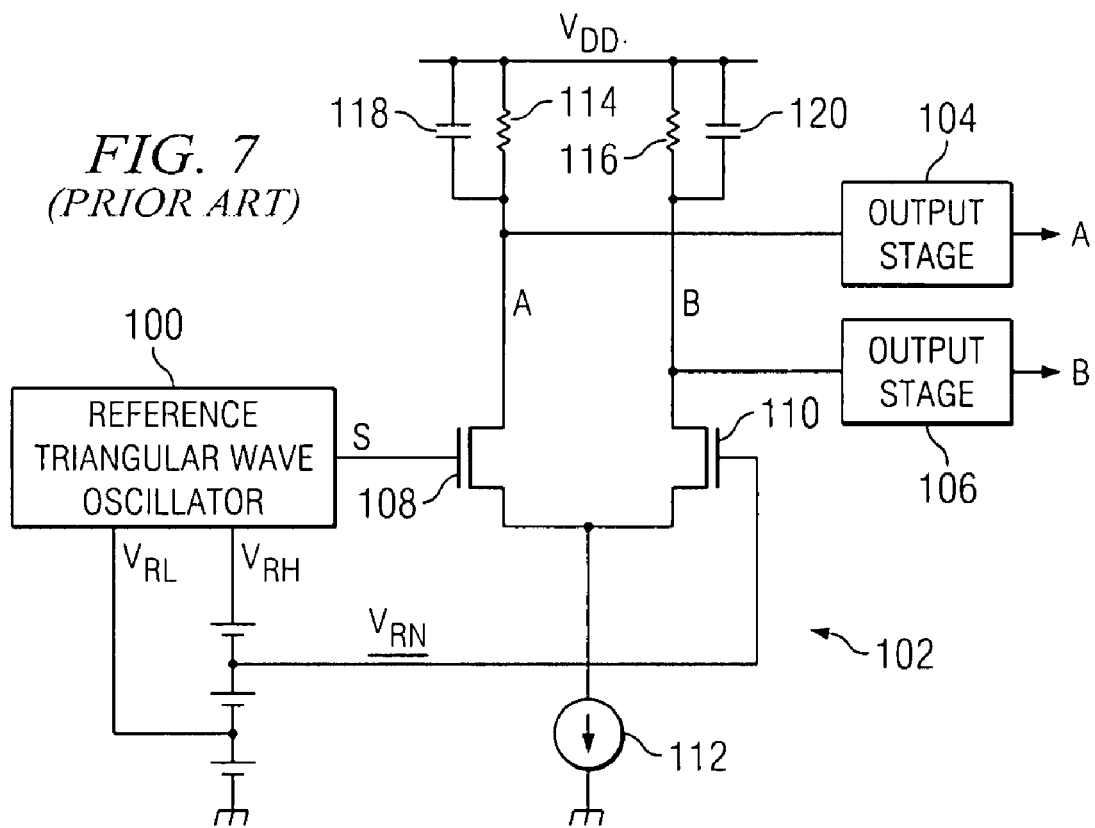
FIG. 7 is a circuit diagram showing the configuration of a conventional multiphased triangular wave oscillating circuit.
Figure 8:
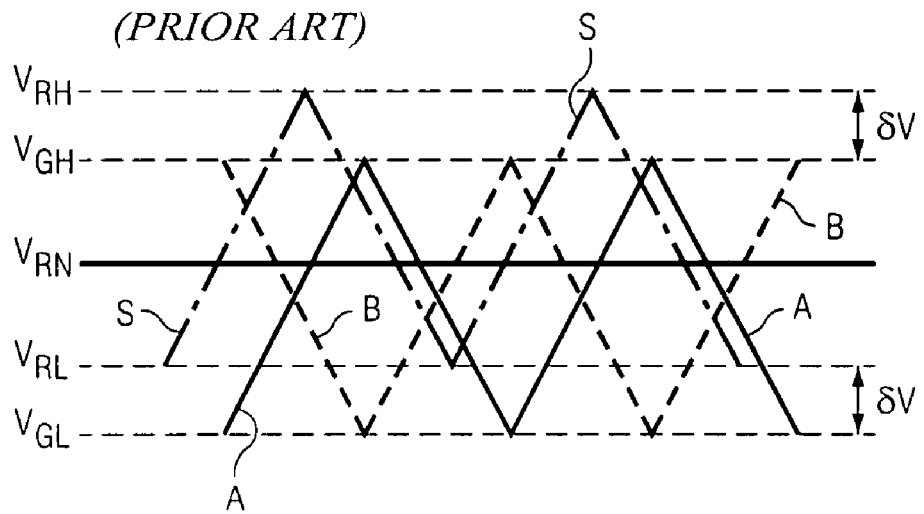
FIG. 8 is a waveform diagram showing an ideal waveform in the conventional multiphased triangular wave oscillating circuit.

As shown in FIG. 6, in the three-phase triangular wave oscillating circuit, similarly to the two-phase triangular wave oscillating circuit (FIG. 1), high-precision three-phase triangular waves A, B, and C with a designed waveform shape, wave crest value, phase relationship, and frequency can be stably oscillated and output.

The switching regulator in an embodiment of the present invention has a voltage input terminal, a voltage output terminal, a feed signal generating circuit for generating a feedback signal corresponding to the output voltage appearing at the voltage output terminal, a triangular wave signal generating circuit for generating a triangular wave signal, a control signal generating circuit that inputs said feedback signal and said triangular wave signal and generates a PWM control signal, and a switching circuit that is PWM-controlled by said PWM control signal, though they are not shown in a figure, and the switching regulator has the multiphased triangular wave oscillating circuit of an above-mentioned embodiment as said triangular wave signal generating circuit. Therefore, the operation effects in the multiphased triangular wave oscillating circuits of the above-mentioned embodiments are reflected on all the functions of the switching regulator, and a high-performance and high-reliability switching operation can be carried out by high-precision PWM control. In particular, the present invention can obtain great advantages in a multiphase type that carries out a switching operation for several switching regulators in the same system by shifting the phase.

Clearly, the multiphased triangular wave oscillating circuit of the present invention is not limited to a switching regulator but can be appropriately applied to an optional PWM control or PWM application (for example, PWM communication). For example, the present invention can also be applied to a PWM such as a class D amplifier in the audio field.

Those skilled in the art to which the invention relates will understand that other modifications, additions and/or substitutions can be made to the described embodiments, without departing from the spirit and scope of the claimed invention.

The invention claimed is:

1. A multiphased triangular wave oscillating circuit, comprising:
    a plurality of triangular wave generating circuits that respectively, selectively generate the output voltage of an up-slope waveform and the output voltage of a down-slope waveform;
    a middle point potential detecting circuit that detects a middle point potential corresponding to an average value of the output voltages of the plurality of triangular wave generating circuits;
    a first control circuit that controls at least one of the output voltages of the plurality of triangular wave generating circuits, so that the middle point potential detected by the middle point potential detecting circuit can be matched with a first reference voltage at a fixed level; and
    a second control circuit that monitors each output voltage of the plurality of triangular wave generating circuits, and switches the output voltage generation mode of the respective triangular wave generating circuit from an up-slope waveform mode to a down-slope waveform mode, or from a down-slope waveform mode to an up-slope waveform mode, when its respective output voltage reaches a reference wave crest value;
    wherein each triangular wave generating circuit has a respective capacitor connected between the output terminal of said triangular wave generating circuit and a second reference voltage source, a charge circuit that charges said respective capacitor to generate the output voltage of the up-slope waveform, and a discharge circuit that discharges said respective capacitor to generate the output voltage of the down-slope waveform.

2. The circuit of claim 1, wherein the middle point detecting circuit includes a resistance circuit that has a plurality of resistance elements of equivalent resistance value, commonly connects one terminal of the each resistance elements, respectively connects the other terminal of each resistance element to the output terminals of a corresponding triangular wave generating circuits, and obtains the middle point potential at the node of the common connection.

3. The circuit of claim 2, wherein the first control circuit has a slope control circuit that compares the middle point potential detected by the middle point detecting circuit with the first reference voltage and variably controls the slope characteristic of at least one output voltage of the triangular wave generating circuits so that the comparison error may be zero.

4. The circuit of claim 1, wherein the second control circuit switches the operating mode of the capacitors from a charge mode to a discharge mode when the output voltage of the up-slope waveform reaches the upper limit reference wave crest value in the respectively associated triangular wave generating circuits, and switches the operating mode of the capacitors from the discharge mode to the charge mode when the output voltage of the down-slope waveform reaches the lower limit reference waveform value in the respectively associated triangular wave generating circuit.

5. A multiphased triangular wave oscillating circuit, comprising:
    first and second triangular wave generating circuits that respectively, selectively generate the output voltage of an up-slope waveform and the output voltage of a down-slope waveform;
    a middle point potential detecting circuit that detects a middle point potential showing an additive average value of each output voltage of the first and second triangular wave generating circuits;

a first control circuit that controls at least one of the output voltages of the first and second triangular wave generating circuits, so that the middle point potential detected by the middle point potential detecting circuit can be matched with a first reference voltage at a fixed level; and a second control circuit that monitors the output voltages of the first and second triangular wave generating circuits, and switches the output voltage generation mode of one of the first and second triangular wave generating circuits from an up-slope waveform mode to a down-slope waveform mode, and switches the output voltage generation mode of the other of the first and second triangular wave generating circuits from the down-slope waveform mode to the up-slope waveform mode, when one of the output voltages reaches a reference wave crest values;

wherein the first triangular wave generating circuit has a first capacitor that is connected between the output terminal of the first triangular wave generating circuit and a second reference potential source, a first charge circuit that charges the first capacitor to generate the output voltage of the up-slope waveform, and a first discharge circuit that discharges the first capacitor to generate the output voltage of the down-slope waveform; and wherein the second triangular wave generating circuit has a second capacitor that is connected between the output terminal of the second triangular wave generating circuit and the second reference voltage source, a second charge circuit that charges the second capacitor to generate the output voltage of the up-slope waveform, and a second discharge circuit that discharges the second capacitor to generate the output voltage of the down-slope waveform.

6. The circuit of claim 5, wherein the middle point detecting circuit has a resistance voltage dividing circuit that has two resistance elements of equivalent resistance value, commonly connects one terminal of each resistance elements, connects the other terminal of each resistance element to the output terminals of the corresponding triangular wave generating circuit, and obtains the middle point potential at the node of the common connection.

7. The circuit of claim 5 wherein at least one of the first and second charge circuits has a constant current circuit.

8. The circuit of claim 7, wherein the first charge circuit and the second charge circuit share a same constant current circuit.

9. The circuit of claim 7, wherein the constant current circuit is operated in accordance with a variable bias.

10. The circuit of claim 9, wherein the first control circuit compares the middle point potential detected by the middle point potential detecting circuit with the first reference voltage and variably controls the bias for the constant current circuit so that the comparison error may be zero.

11. The circuit of claim 5 wherein at least one of the first and second discharge circuits has a constant current circuit.

12. The circuit of claim 11, wherein the first discharge circuit and the second discharge circuit share one constant current circuit.

13. The circuit of claim 11, wherein the constant current circuit is operated in accordance with a variable bias.

14. The circuit of claim 13, wherein the first control circuit compares the middle point potential detected by the middle point potential detecting circuit with the first reference potential and variably controls the bias for the constant current circuit so that the comparison error may be zero.

15. The circuit of claim 5, wherein the second control circuit switches the operating mode of the first capacitor in the first triangular wave generating circuit from a discharge mode to a charge mode and switches the operating mode of the second capacitor in the second triangular wave generating circuit from the charge mode to the discharge mode when the output voltage of the first triangular wave generating circuit reaches the lower limit reference wave crest value, and switches the operating mode of the second capacitor in the second triangular wave generating circuit from the discharge mode to the charge mode and switches the operation mode of the first capacitor in the first triangular wave generating circuit from the charge mode to the discharge mode when the output voltage of the second triangular wave generating circuit reaches the lower limit reference wave crest value.

16. The circuit of claim 5, wherein the second control circuit switches the operating mode of the first capacitor in the first triangular wave generating circuit from the charge mode to the discharge mode and switches the operating mode of the second capacitor in the second triangular wave generating circuit from the discharge mode to the charge mode when the output voltage of the first triangular wave generating circuit reaches the upper limit reference wave crest value, and switches the operating mode of the second capacitor in the second triangular wave generating circuit from the charge mode to the discharge mode and switches the operation mode of the first capacitor in the first triangular wave generating circuit from the discharge mode to the charge mode when the output voltage of the second triangular wave generating circuit reaches the upper limit reference wave crest value.

* * * * *